May 29, 1928.
I. A. RANDEL
1,671,743
SEAT FOR EQUALIZING BARS
Filed April 18, 1927
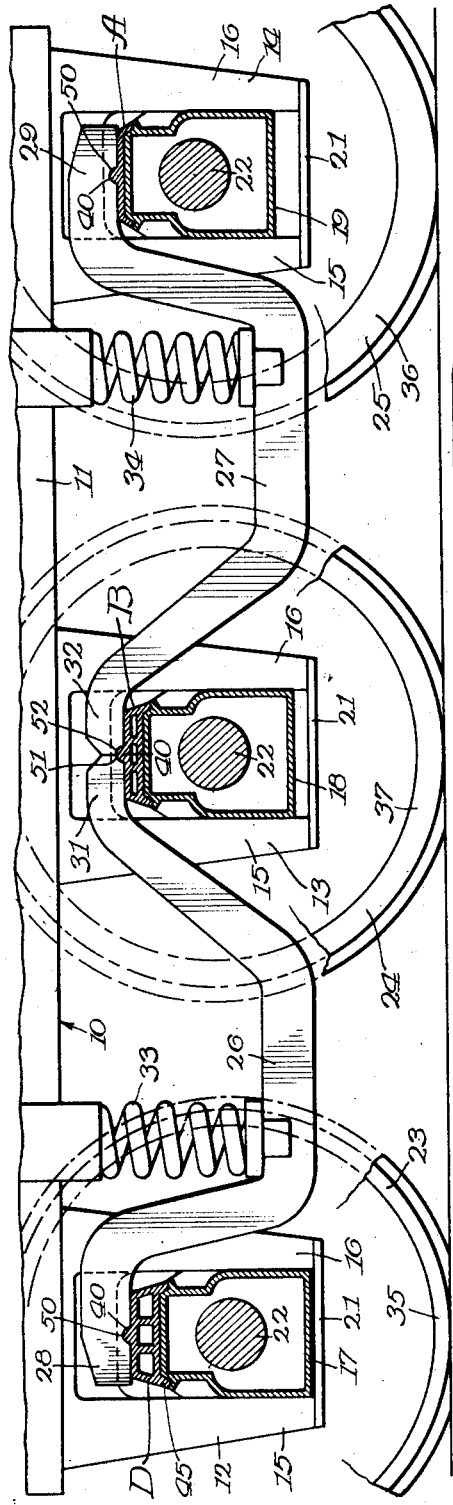
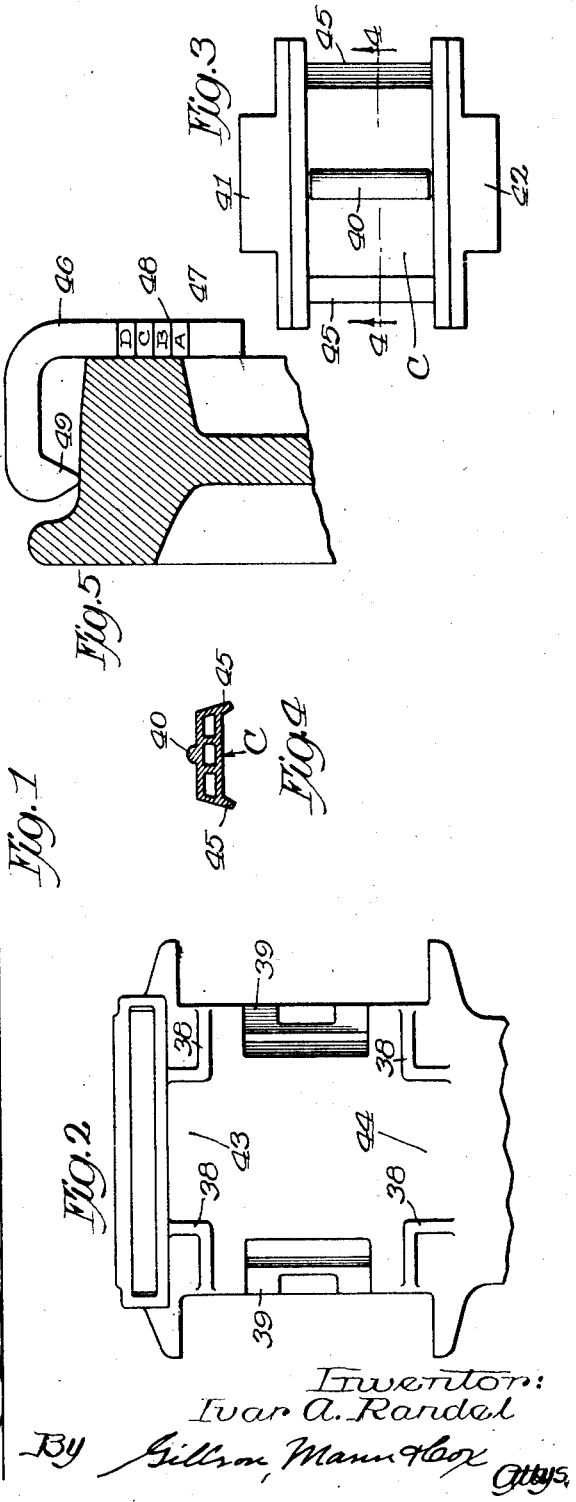
Inventor:
Ivar A. Randel
By Gillson, Mann & Cox
Attys.

Patented May 29, 1928.

1,671,743

UNITED STATES PATENT OFFICE.

IVAR A. RANDEL, OF CHICAGO, ILLINOIS.

SEAT FOR EQUALIZING BARS.

Application filed April 18, 1927. Serial No. 184,481.

This invention relates to railway trains, and more particularly to seats for equalizing bars.

The principal object of the invention is the provision of new and improved means for maintaining the equalizing bars on railway trucks in a horizontal position at a substantially predetermined distance from the rails.

A further object of the invention is the provision of new and improved seats for the ends of equalizing bars that may be readily replaced with the desired size or sizes for the proper adjustment of the equalizing bars.

A still further object of the invention is the provision of new and improved means for compensating for the wear on the tires of railway wheels that is cheap to manufacture, simple in construction, easily installed or changed as occasion may require, and that is not likely to become broken or get out of order.

Other and further objects and advantages of the invention will appear from the following description, taken in connection with the accompanying drawings, in which:

Fig. 1 is a vertical section of a portion of a railway car truck showing my invention in position thereon, with parts removed for the sake of clearness;

Fig. 2 is a top plan view of a journal box;

Fig. 3 is a top plan view of an equalizing bar seat;

Fig. 4 is a section on line 4—4 of Fig. 3; and

Fig. 5 is a transverse section of a portion of a car wheel with the gauge in position thereon.

In supporting trucks for railway cars, it often happens that the tires on some of the wheels will wear faster than on others, which will cause the load equalizing bars to rest unevenly on their supporting seats whereby the journal boxes will become tilted, thereby causing considerable friction between the boxes and the sides of the pedestals or guides. Furthermore, the tilting of the equalizer bars due to the unequal thicknesses of the wheel tires does not properly distribute the load because of the effective shortening of the lever effect of the equalizer bars. In other words, when one end of the equalizer bar is higher than the other, due to the unequal wear on the tires, the seat members will engage the higher end portion of the equalizer bar at a distance from the end whereby the load will not be properly distributed on said bars.

The present invention seeks to avoid this difficulty by providing a plurality of interchangeable equalizer seat members of varying thicknesses.

Referring now to the drawings, in which the numeral 10 designates generally a six-wheel truck of any approved construction. The wheel piece of the truck frame is shown at 11, to which is attached what for convenience of description will be termed the front, intermediate and rear pedestals 12, 13 and 14 respectively. Each pedestal is provided with depending legs 15 and 16 between which are slidably mounted the front, intermediate and rear journal boxes 17, 18 and 19 respectively. The pedestal tie bar 21 connects the lower ends of the legs of the pedestal as is common in such constructions. Axles 22 journaled in the boxes 17, 18 and 19 are provided with the front, intermediate and rear car wheels 23, 24 and 25 respectively as is usual in such constructions.

In order to resiliently support the truck frame 10 from the axles 22, equalizing bars 26 and 27 are employed. Each of these bars is substantially U-shaped with its ends extending in opposite directions. The outer ends 28 and 29 of the bars 26 and 27 extend over the journal boxes 17 and 19 respectively and are supported thereby. The inner ends 31 and 32 of the bars 26 and 27 respectively extend over the journal box 18 and are in engagement with each other at the vertical center line of said box.

Suitable springs 33 and 34 are adapted to support the truck frame from the bars 26 and 27 respectively. In order that the journal boxes shall support substantially equal weights the spring seat for the spring 33 is attached to the equalizing bar 26 at a third of the distance between the front and intermediate axles, and the spring 34 is placed at a third of the distance between the rear and intermediate axles.

The structure thus far described may be the usual or any well known construction employed in the building of railway car trucks.

It is well known that the tires of the wheels of a truck do not wear away evenly. On some of the wheels they will wear much faster than on others. This difference is illustrated by way of example in Fig. 1 in which the tire 35 of the front wheel 23 is worn most, the tire 36 of the rear wheel the least, and the tire 37 of the intermediate wheel slightly less than the tire of the front wheel. It is evident that if the equalizing bar seats for supporting the ends of the equalizing bars from the journal boxes be of the same thickness, one end of the truck frame will be closer to the tracks than the other. In other words, the axle of the front wheel would be nearer the tracks than the axle of the intermediate wheel, and consequently the front end 28 of the equalizing bar 26 would engage the front edge only of the journal box 17, which would cause the top of the journal box to tip forwardly, thereby creating friction between the journal box and the jaw of the pedestal and interfering with the free vertical movement of said journal box. Likewise the rear end 31 of the equalizing bar 36 would engage the upper front edge of the journal box 18, thereby causing the upper end of the same to tip forwardly and interfere with the free movement of the journal box in the jaw of the pedestal 13.

Furthermore, when the parts are in this position the distance between the bearing point on the end 28 and the spring 33 will be greater than one third the distance between the spring 33 and the bearing point on the end 31 of the equalizing bar 26, consequently the journal 18 will be supporting more than its proportionate part of the load.

In order that the journal boxes shall be free to slide vertically in the jaws of the pedestals it is desirable that means be provided for maintaining the upper ends of the equalizing bars substantially in a horizontal plane. In the present invention this is accomplished by providing equalizing bar seats of varying thicknesses which are adapted to compensate for the decrease in radius of the wheels due to the wearing of the tires. As shown, a plurality of equalizing bar seats or blocks A, B, C and D are employed for this purpose. These blocks are so constructed that they interlock with the tops of the journal boxes so that they will be held in proper position thereon. Any suitable means may be provided for this purpose. As shown, the tops of the journal boxes are provided with the angular flanges 38, see Fig. 2, and with depressions 39 at each side of the box. The blocks are each provided with lateral extensions 41 and 42 which are adapted to fit in the spaces 43 and 44 between the angular flanges 38 on the journal boxes. They are also provided with depending lips or flanges 45 for engaging the depressions 39.

A rib 40 is also provided for engaging a corresponding recess 50 in the outer ends of the bars 26 and 27 for providing a supporting fulcrum and for preventing endwise movement of said bars. At the inner ends of the bars 26 and 27 the recess for receiving the rib 40 is partly in one and partly in the other. As shown, the inner end of the bar 26 is provided with a recess 51 which with the recess 52 in the inner end of the bar 27, forms a recess for receiving said rib 40.

In the operation of the device, when the tire of any of the wheels becomes worn so that the tops of the seats are no longer in the same horizontal plane the car frame is jacked up, the seat removed and a thicker seat inserted.

Any suitable number of sizes of seats may be employed. Only four are shown, but these are by way of example only.

In Fig. 5 is shown a gauge for determining the size block to employ. As shown, the gauge 46 comprises the standard 47 having the graduations 48 thereon. These graduations may be indicated by the letters A, B, C and D for indicating the size block to be employed. The gauge is also provided with a return bend 49 for engaging the tread surface of the tire. As shown in this figure, the tire is worn but slightly and block A is all that is necessary.

The blocks or equalizing bar seats A, B, C and D are graduated in thickness, the block A being the thinnest and the one that is used with new wheels, and the block D being the thickest and the one that is used when the tires are worn the most.

While I have shown a six wheel truck with my invention in position thereon, it is understood that this arrangement is by way of example only and my invention is applicable to trucks having a greater or less number of wheels. In all cases, the object is to keep the ends of the equalizing bars in a substantially horizontal plane whereby each of the journal boxes will not only support its equal share of the load, but will also be free to slide vertically in the jaw of the corresponding pedestal.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention—

1. In combination, a railway truck comprising front, rear and intermediate wheels at one side of said truck, said wheels having tires of different thicknesses, a journal box for each wheel, each box being provided with angular flanges spaced apart at each end thereof and having recesses in each side between said flanges, an equalizing bar between the front and intermediate wheels and one between the rear and intermediate wheels, a removable seat for supporting the ends of said bars, said seats being of different thicknesses to compensate for the difference in thickness of said tires, each seat being provided with lateral extensions for engaging between said flanges and with downwardly and outwardly extending projections for engaging in said recesses.

2. An equalizer seat comprising a block having flanges and extensions on its bottom and edges for interlocking with corresponding depressions and notches in a journal box, and a fulcrum projection on its upper surface.

In testimony whereof I affix my signature.

IVAR A. RANDEL.